United States Patent [19]
Pahl

[11] Patent Number: 6,089,552
[45] Date of Patent: Jul. 18, 2000

[54] AIR SPRING SYSTEM

[75] Inventor: Hans-Joachim Pahl, Ronnenberg, Germany

[73] Assignee: ContiTech Luftfedersysteme GmbH, Hannover, Germany

[21] Appl. No.: 09/317,187

[22] Filed: May 24, 1999

[51] Int. Cl.[7] .................................................. F16F 9/04
[52] U.S. Cl. .................................. 267/64.24; 267/64.21; 280/124.141
[58] Field of Search ............................ 267/64.15, 64.19, 267/64.21, 64.23, 64.24, 64.26; 280/124.136, 124.141

[56] References Cited

U.S. PATENT DOCUMENTS

| | | | |
|---|---|---|---|
| 2,980,441 | 4/1961 | Timpner et al. | 280/124.141 |
| 3,010,715 | 11/1961 | Slemmons et al. | 267/64.24 |
| 4,325,541 | 4/1982 | Korosladanyi et al. | 267/220 |
| 4,635,745 | 1/1987 | Myers et al. | 280/708 |
| 5,129,634 | 7/1992 | Harris | 267/64.24 |
| 5,667,203 | 9/1997 | Romer | 267/64.23 |

FOREIGN PATENT DOCUMENTS 1043425  9/1966  United Kingdom .

*Primary Examiner*—Chris Schwartz
*Attorney, Agent, or Firm*—Walter Ottesen

[57] ABSTRACT

The invention is directed to an air spring system wherein an adequate carrying off of heat is ensured for a shock absorber (18) which is completely within an air spring (16) which includes a flexible member (4) and a roll-off piston (6). The interior spaces (12, 14) of the flexible member (4) and the roll-off piston (6) communicate with each other. In lieu of a conventional clamping plate, a funnel-shaped insert (22) is disposed between the flexible member (4) and the roll-off piston (6). The insert (22) surrounds the shock absorber (18) in such a manner that an annular nozzle-shaped narrow (23) results between the walls of the shock absorber (18) and the inner surface of the funnel-shaped insert (22). Openings (26) are disposed on the outer region of the insert (22). These openings (26) as well as the nozzle-shaped narrow (23) define a connection between the volume (12) of the flexible member (4) and the volume (14) of the roll-off piston (6). An air circulation (30) with an air flow along the wall of the shock absorber (18) results during spring compression and spring expansion.

6 Claims, 2 Drawing Sheets

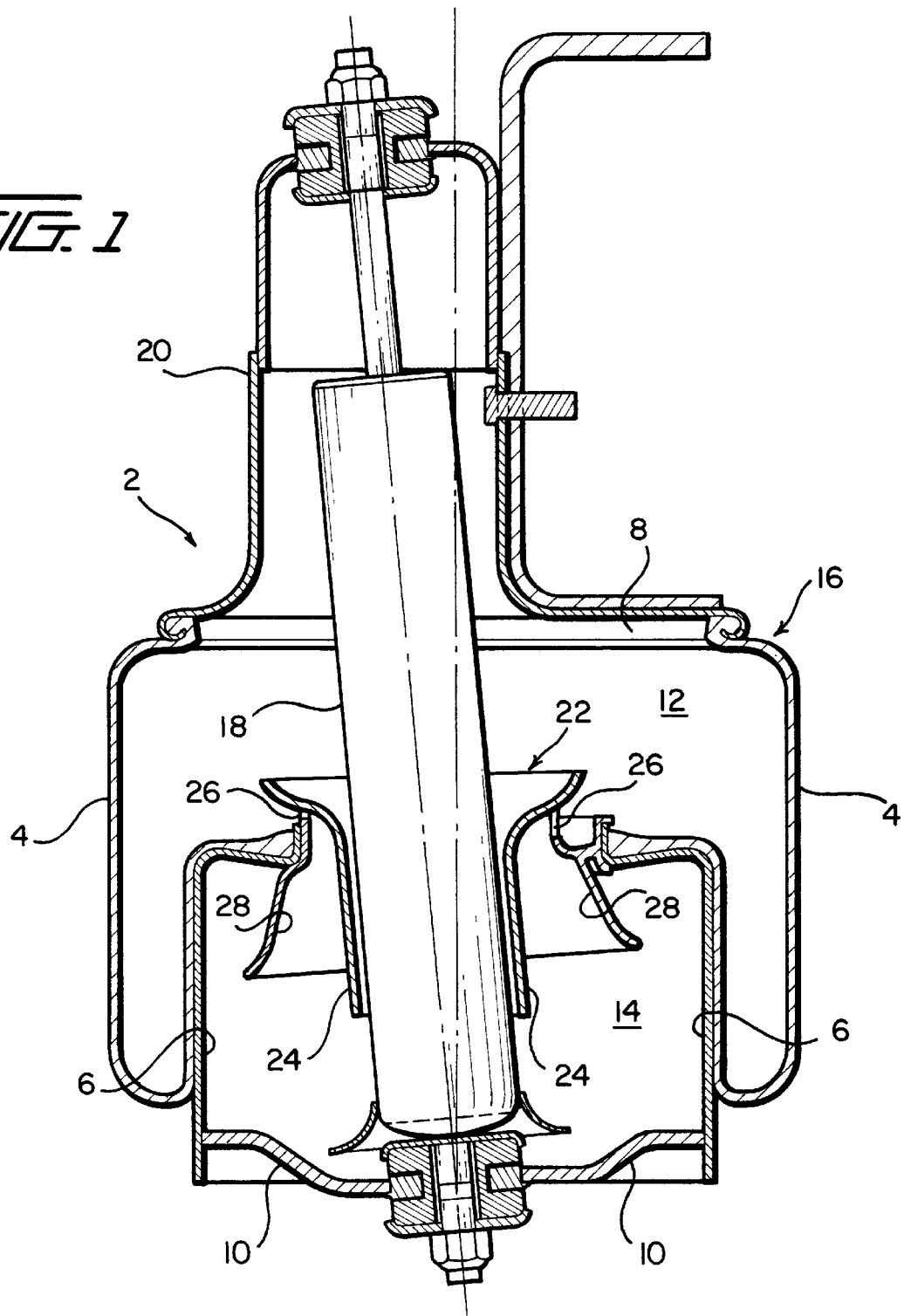

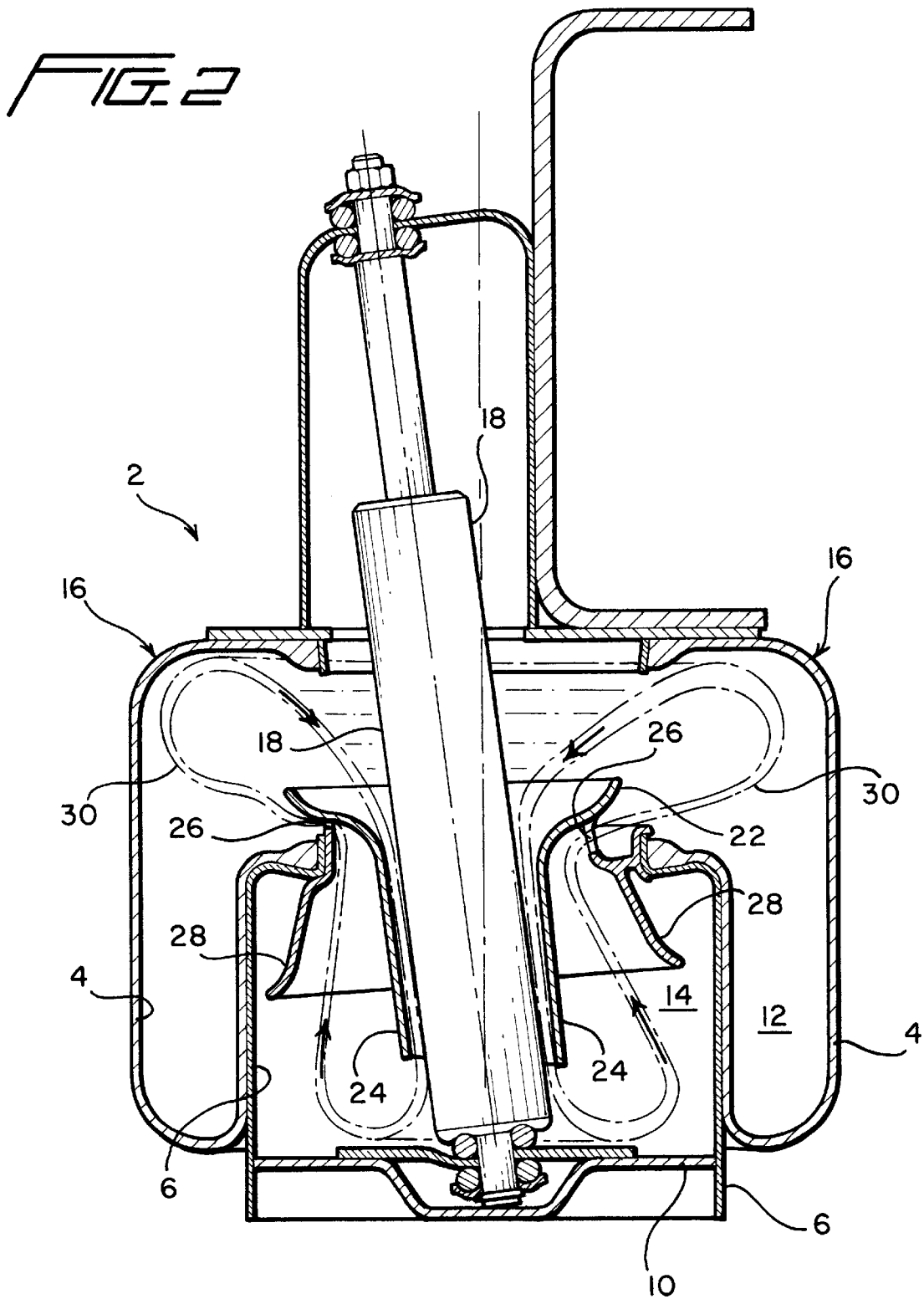

AIR SPRING SYSTEM

FIELD OF THE INVENTION

The invention relates to an air spring system having an air spring and a shock absorber. The air spring includes a flexible member and a roll-off piston. The volume of the flexible member and the volume of the roll-off piston conjointly define a common spring volume.

BACKGROUND OF THE INVENTION

In such an air spring system, vibration or pulsating energy is converted into heat in the shock absorber during spring compression and spring expansion. The heat generated in this manner must be directed away.

Usually, adequate cooling is provided by the driving wind when the shock absorber is mounted laterally of the air spring. However, two separate components have to be mounted which makes a longer dwell time on the assembly line necessary. Furthermore, a larger space for accommodating the components is required when the shock absorber and the air spring are arranged one next to the other.

British Patent 1,043,425 discloses an improved air spring system. Here, a shock absorber is integrated to the extent of about one half thereof in an air spring. The portion of the shock absorber which projects outwardly from the air spring is stroked by the driving wind. At the same time, deflecting and redirecting elements guide a part of the driving wind through an intermediate space between the upper part of the shock absorber and the roll-off piston.

Here too, a larger space is needed for accommodating the components. Increased contamination cannot be avoided here because the arrangement must be subjected to the driving wind.

SUMMARY OF THE INVENTION

It is an object of the invention to provide an air spring system wherein the shock absorber is arranged completely within an air spring. The system ensures an adequate removal of heat from the shock absorber.

The air spring system of the invention includes: an air spring including a mount, a roll-off piston and a flexible member connected between the mount and the roll-off piston whereby the flexible member rolls on the roll-off piston as the air spring expands and compresses during the operation thereof; the flexible member delimiting a first volume and the roll-off piston delimiting a second volume and the first and second volumes conjointly defining a common spring volume of the air spring; the roll-off piston having an opening formed therein between the first and second volumes; a shock absorber mounted completely within the air spring and extending between the first and second volumes through the opening; a tapered funnel-shaped insert at least partially surrounding the shock absorber to conjointly define an inner funnel-shaped narrow passage therewith interconnecting the first and second volumes along a first path; the insert having a peripheral edge structure defining an interface between the first and second volumes; and, a plurality of apertures formed in the peripheral edge structure and interconnecting the first and second volumes along a second path whereby air is circulated through the first and second volumes and along the first path and the shock absorber and the second path as the air spring expands and compresses.

A commercially available one-tube or two-tube shock absorber is integrated into the air spring and the heat generated by this shock absorber is conducted away via convection. According to the invention, the functions of the two components (air spring and shock absorber) are spatially united in a single aggregate. The shock absorber is arranged completely within the air spring. For this reason, a single component, which is ready for mounting, is available on the assembly line. This reduces the number of assembly steps and therefore the dwell time on the assembly line.

The total structural height is so small that an installation on the rear axle of commercial vehicles is possible without difficulty.

An air flow along the outer wall of the shock absorber is present during spring compression and spring expansion because of the jet-shaped narrow of the insert. If the outer openings of the insert likewise have a funnel shape but are arranged in a direction opposite to the inner funnel-shaped narrow, then an increased circulation of air is obtained during spring compression and spring expansion.

If a flexible material is selected for the inner funnel-shaped component part of the insert, then a destruction of the insert is avoided even for extreme wobbling movements of the air spring.

BRIEF DESCRIPTION OF THE DRAWINGS

The invention will now be described with reference to the drawings wherein:

FIG. 1 is a longitudinal view, partially in section, of an embodiment of an air spring system according to the invention; and, FIG. 2 is a side elevation view of the air spring system of FIG. 1 showing the operation thereof.

DESCRIPTION OF THE PREFERRED EMBODIMENTS OF THE INVENTION

The air spring system 2 shown in FIG. 1 essentially comprises a flexible member 4 and a cylindrical roll-off piston 6. The flexible member 4 is attached at the upper end to a flanged plate 8. The lower end of the roll-off piston 6 is defined by a piston support 10.

The interior spaces (12, 14) of the flexible member 4 and the roll-off piston 6 communicate with each other and conjointly define the effective air spring volume (12+14). A conventional shock absorber 18 is disposed within the air spring 16. On the one hand, the shock absorber 18 is supported on an extension 20 disposed on the flanged plate 8 while, on the other hand, the shock absorber is elastically attached to the piston support 10. More specifically, the shock absorber 18 extends over the entire clear height of the air spring 16.

In lieu of a conventional clamping plate, a funnel-shaped insert 22 is disposed between the flexible member 4 and the roll-off piston 6. The funnel-shaped insert 20 surrounds the shock absorber 18 so that an annular nozzle-shaped narrow 24 results between the walls of the shock absorber 18 and the inner surface of the funnel-shaped insert 22. (The lower edge of the flexible member 4 would otherwise be vulcanized to the clamping plate.)

Openings 26 are disposed in the outer region of the funnel-shaped insert 22. The openings 26 establish a connection between the volume 12 of the flexible member 4 and the volume 14 of the roll-off piston 6 in the same manner as the nozzle-shaped narrow 23. The outer edge of the insert 22 defines a tight and fixed connection between the lower end of the flexible member 4 and the upper edge of the roll-off piston 6.

In the embodiment shown in FIG. 1, not only is the inner region of the insert 22 configured to be funnel-shaped, but also the outer region has a funnel-shaped configuration. The outer funnel 28 is aligned in opposition to the inner funnel 24. Preferably, the inner funnel-shaped region 24 is made of flexible material.

The operation of the coolable air spring system of the invention will now be explained with reference to FIG. 2.

During spring compression, the flexible member 4 is pushed together whereby the volume 12 of the flexible member 4 is reduced and the air pressure is correspondingly increased. Air now flows from the flexible member 4 via the narrow 23 of the funnel-shaped insert 22 along the shock absorber 18 into the roll-off piston 6 to effect a pressure balance between the interior space 12 of the flexible member 4 and the interior space 14 of the roll-off piston 6. An increased velocity results here according to the continuity equation $F_1 v_1 = F_2 v_2$ because of the nozzle-shaped narrow 23.

If one assumes ideal conditions in a rough approximation, then, according to Bernoulli, the total pressure $p = p_0 + \rho v^2/2$ is constant which means that, at the jet output 23, an underpressure is present because of the high velocity. The total pressure p is made up of the static pressure and the backup pressure. Compared to the flow through the other openings 26, this underpressure leads to an increased flow because of the nozzle-shaped configuration.

During spring expansion, the oppositely orientated outer funnel 26 operates as a flow accelerator so that, overall, an air circulation 30 is generated in the direction of the arrows shown. The shock absorber 18 becomes warm because of the spring compression and spring expansion and is cooled down by this air circulation 30 which is conducted along the shock absorber 18 in that the power loss is distributed in the air spring volume (12+14). The power loss is generated in the shock absorber 18 in the form of heat. The further carrying off of heat then takes place via the outer surface of the air spring flexible member 4 which lies in the driving wind flow as well as via the outer surface of the piston 6.

It is understood that the foregoing description is that of the preferred embodiments of the invention and that various changes and modifications may be made thereto without departing from the spirit and scope of the invention as defined in the appended claims.

What is claimed is:

1. An air spring system comprising:

an air spring including a mount, a roll-off piston and a flexible member connected between said mount and said roll-off piston whereby said flexible member rolls on said roll-off piston as said air spring expands and compresses during the operation thereof;

said flexible member delimiting a first volume and said roll-off piston delimiting a second volume and said first and second volumes conjointly defining a common spring volume of said air spring;

said roll-off piston having an opening formed therein between said first and second volumes;

a shock absorber mounted completely within said air spring and extending between said first and second volumes through said opening;

a tapered funnel-shaped insert at least partially surrounding said shock absorber to conjointly define an inner funnel-shaped narrow passage therewith interconnecting said first and second volumes along a first path;

said insert having a peripheral edge structure defining an interface between said first and second volumes; and, a plurality of apertures formed in said peripheral edge structure and interconnecting said first and second volumes along a second path whereby air is circulated through said first and second volumes and along said first path and said shock absorber and said second path as said air spring expands and compresses.

2. The air spring system of claim 1, said insert being configured as a nozzle directed toward said second volume.

3. The air spring system of claim 2, said peripheral edge structure being configured as an outer funnel and being directed oppositely to said tapered funnel-shaped insert whereby a more intense circulation of air occurs as said air spring expands and compresses during the operation thereof.

4. The air spring system of claim 3, wherein said peripheral edge structure has a base region attached to said insert and said base region defining said interface and said plurality of apertures being formed in said interface.

5. The air spring system of claim 1, wherein at least said tapered funnel-shaped insert is made of a flexible material.

6. The air spring system of claim 1, said roll-off piston having a mounting plate formed therein; and, said shock absorber having a first end connected to said mount and a second end connected to said mounting plate.

* * * * *